US012673493B2

(12) United States Patent
Yaginuma

(10) Patent No.: US 12,673,493 B2
(45) Date of Patent: Jul. 7, 2026

(54) LIQUID EJECTION HEAD AND MANUFACTURING METHOD THEREOF

(71) Applicant: CANON KABUSHIKI KAISHA, Tokyo (JP)

(72) Inventor: Seiichiro Yaginuma, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 260 days.

(21) Appl. No.: 18/359,635

(22) Filed: Jul. 26, 2023

(65) Prior Publication Data

US 2024/0034062 A1 Feb. 1, 2024

(30) Foreign Application Priority Data

Aug. 1, 2022 (JP) ................................. 2022-122441

(51) Int. Cl.
*B41J 2/14* (2006.01)
*B41J 2/16* (2006.01)

(52) U.S. Cl.
CPC ......... *B41J 2/14201* (2013.01); *B41J 2/1623* (2013.01); *B41J 2/1637* (2013.01)

(58) Field of Classification Search
CPC .... B41J 2/14201; B41J 2/14233; B41J 2/161; B41J 2/1635; B41J 2/01; B41J 2/1607; B41J 2/14209; B41J 2/14274; B41J 2/14282; B41J 2/1429; B41J 2/14298; B41J 2002/14217; B41J 2002/14225; B41J 2002/14241; B41J 2002/1425; B41J 2002/14266
See application file for complete search history.

(56) References Cited

U.S. PATENT DOCUMENTS

| | | | | |
|---|---|---|---|---|
| 2009/0186215 | A1* | 7/2009 | Sato | B32B 7/04 156/182 |
| 2009/0189958 | A1 | 7/2009 | Ogata | |
| 2012/0268510 | A1 | 10/2012 | Kojima | |

FOREIGN PATENT DOCUMENTS

| | | | |
|---|---|---|---|
| CN | 1646323 | A | 7/2005 |
| CN | 1876378 | A | 12/2006 |
| CN | 101204876 | A | 6/2008 |
| CN | 101491961 | A | 7/2009 |
| CN | 104441996 | A | 3/2015 |
| CN | 110843342 | A | 2/2020 |
| JP | 4300565 | B2 | 7/2009 |

* cited by examiner

*Primary Examiner* — Kristal Feggins

(74) *Attorney, Agent, or Firm* — Canon U.S.A., Inc., IP Division

(57) ABSTRACT

A liquid ejection head includes a nozzle plate where a nozzle for ejecting a liquid is provided, a substrate including a piezoelectric element for generating pressure for ejecting the liquid from the nozzle, and a wall member made of a resin and provided between the nozzle plate and the substrate to form a pressure chamber that communicates with the nozzle. A structure for connecting at least two side surfaces, among a plurality of side surfaces of the wall member that forms the pressure chamber, is provided.

10 Claims, 14 Drawing Sheets

LIQUID EJECTION HEAD AND MANUFACTURING METHOD THEREOF

BACKGROUND

Field of the Disclosure

The present disclosure relates to a liquid ejection head and a manufacturing method of the liquid ejection head.

Description of the Related Art

To achieve higher-definition and higher-quality printing on an inkjet printer that is a liquid ejection apparatus, it is necessary to manufacture a high-definition liquid ejection head by improving working accuracy of the liquid ejection head. Japanese Patent No. 4300565 discusses a piezoelectric liquid ejection head in which nozzles can be arranged in a highly-integrated manner at low cost by using a photosensitive resin as a material of pressure chambers.

According to the liquid ejection head discussed in Japanese Patent No. 4300565, it is possible to arrange the nozzles in a highly-integrated manner by improving the working accuracy by forming the pressure chambers using a photosensitive resin. However, in a case where the degree of integration of the nozzles is improved, the liquid ejection frequency may decrease because walls between the adjacent pressure chambers are thin and can deform easily.

SUMMARY

Aspects of the present disclosure generally provide a liquid ejection head capable of suppressing deformation of pressure chambers in a case where the pressure chambers are formed of a resin, and a manufacturing method of the liquid ejection head.

According to an aspect of the present disclosure, a liquid ejection head includes a nozzle plate where a nozzle for ejecting a liquid is provided, a substrate including a piezoelectric element for generating pressure for ejecting the liquid from the nozzle, a wall member made of a resin and provided between the nozzle plate and the substrate to form a pressure chamber that communicates with the nozzle, wherein a structure for connecting at least two side surfaces, among a plurality of side surfaces of the wall member that forms the pressure chamber, is provided.

According to another aspect of the present disclosure, a manufacturing method of a liquid ejection head including a nozzle plate where a nozzle for ejecting a liquid is provided, a substrate including a piezoelectric element for generating pressure for ejecting the liquid from the nozzle, and a wall member made of a resin and provided between the nozzle plate and the substrate to form a pressure chamber that communicates with the nozzle, wherein a structure for connecting at least two side surfaces, among a plurality of side surfaces of the wall member that forms the pressure chamber, is provided includes forming the piezoelectric element on the substrate, forming the wall member on the substrate by using a photosensitive resin, and bonding the nozzle plate to the wall member, wherein the forming of the wall member includes molding a first photosensitive resin and exposing the first photosensitive resin to light, molding a second photosensitive resin on the first photosensitive resin and exposing the second photosensitive resin to light, and collectively developing the first photosensitive resin and the second photosensitive resin.

Further features of the present disclosure will become apparent from the following description of embodiments with reference to the attached drawings.

DESCRIPTION OF THE EMBODIMENTS

Figure 1:
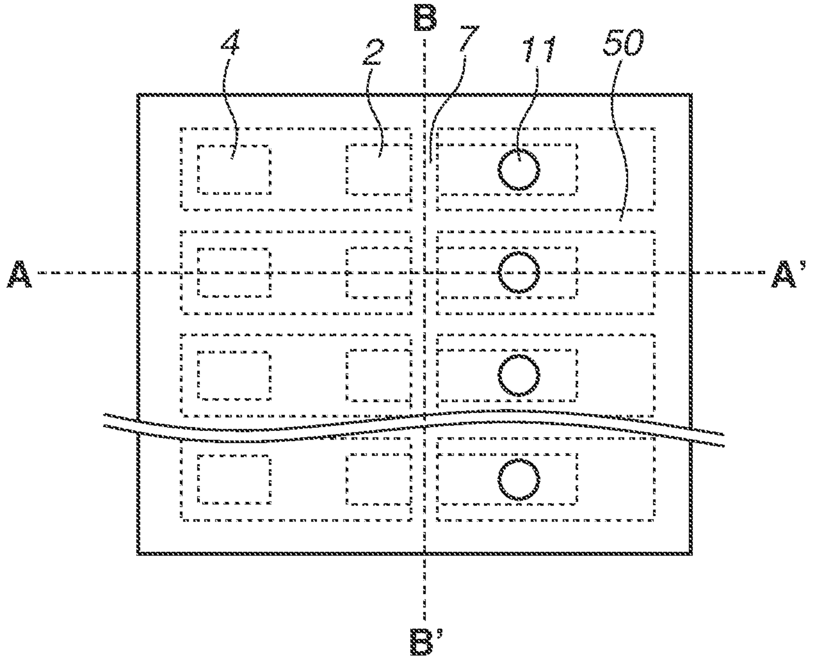
FIG. 1 is a view illustrating an example of a liquid ejection head according to an embodiment of the present disclosure.

FIG. 1 is a top plan view illustrating an example of a liquid ejection head according to an embodiment of the present disclosure as viewed from a side on which nozzles 11 are located.

Dashed lines in FIG. 1 indicate a part of an internal structure that cannot be seen from the side of the nozzles 11. The plurality of nozzles 11 is arranged in a line, and pressure chambers 10 (see FIG. 2A) each having a substantially cuboid shape and respectively corresponding to the nozzles 11 are arranged in such a manner that long sides of the pressure chambers 10 are adjacent to each other in a short side direction of the pressure chambers 10. The shape of the pressure chambers 10 is not limited to a substantially cuboid shape.

Figure 2A:
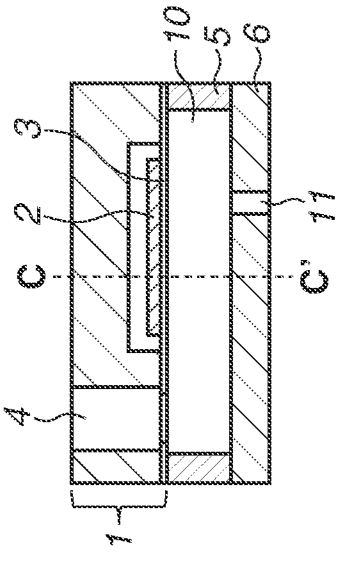
FIGS. 2A and 2B are cross-sectional views illustrating an example of a liquid ejection head according to a comparison example.

An issue addressed by the present embodiment will be described first with reference to a liquid ejection head according to a comparison example illustrated in FIGS. 2A to 2D. FIG. 2A is a cross-sectional view in a direction parallel to a long side direction of the pressure chambers 10. A substrate 1 includes piezoelectric elements 2, vibration plates 3, and liquid supply ports 4. The piezoelectric elements 2 each have a substantially rectangular shape and extend in the long side direction of the pressure chambers 10 each having a substantially cuboid shape. A pressure chamber wall member 5 is connected to a surface of the substrate 1 on which the vibration plates 3 are located, and a nozzle plate 6 on which the nozzles 11 are arranged is connected to a surface of the pressure chamber wall member 5 opposite to a surface of the pressure chamber wall member 5 connected to the substrate 1. The pressure chambers 10 are spaces surrounded by the nozzle plate 6, the substrate 1, and the pressure chamber wall member 5. The pressure chambers 10 communicate with the corresponding nozzles 11. A liquid supplied from the liquid supply ports 4 to the pressure chambers 10 and the nozzles 11 is ejected from the nozzles 11 when the piezoelectric elements 2 are driven to cause the vibration plates 3 to warp toward the inner side of the pressure chambers 10. It is possible to arrange the nozzles 11 in a highly-integrated manner at low cost by forming the pressure chamber wall member 5 using a photosensitive material such as a photosensitive resin.

Working accuracy can also be improved easily compared to a case where the pressure chamber wall member 5 is formed using an inorganic material.

Figure 2B:
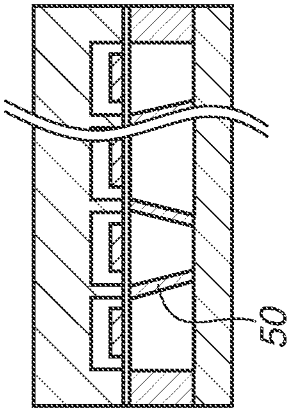
Figure 2C:
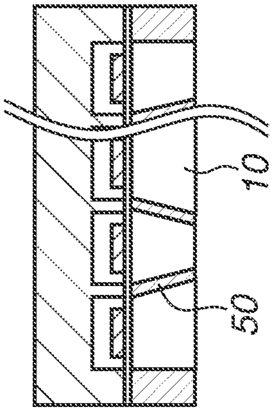
FIGS. 2C and 2D are views illustrating an example of the liquid ejection head according to the comparison example in a middle of a manufacturing process thereof.
Figure 2D:
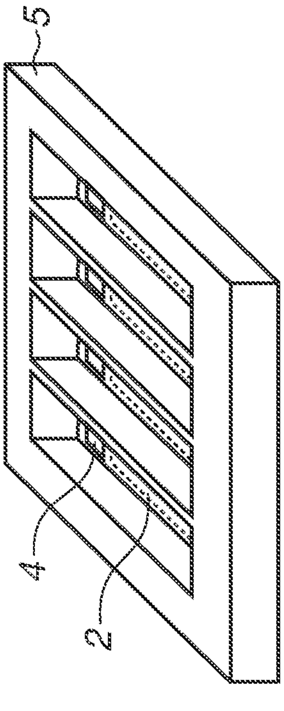

FIG. 2B is a cross-sectional view taken along a line C-C' in FIG. 2A, and FIG. 2D is a perspective view illustrating the pressure chamber wall member 5 viewed from the surface thereof bonded to the nozzle plate 6. The plurality of pressure chambers 10 is arranged adjacent to each other in the short side direction of the pressure chambers 10 with pressure chamber walls 50 therebetween. In a case where the plurality of nozzles 11 and the plurality of pressure chambers 10 are formed in a high density state and the pressure chamber walls 50 are thin, the pressure chamber walls 50 can deform easily as illustrated in FIG. 2B. This may affect the ejection of the liquid.

FIG. 2C illustrates an example of the liquid ejection head according to the comparison example in the middle of a manufacturing process thereof, and illustrates a state where the pressure chamber wall member 5 is connected to the substrate 1. There is a case where the pressure chamber walls 50 of the pressure chamber wall member 5 become deformed when the pressure chamber wall member 5 having the pressure chambers 10 is processed with a resin. The deformation of the pressure chamber walls 50 is likely to occur in a development process, a drying process, and a heat treatment process in the case of using a photosensitive resin, and it is also likely to occur in subsequent processes such as a surface treatment process, a film formation process, and a formation process of the nozzle plate 6. This may cause a failure to obtain the working accuracy of the pressure chambers 10 of the liquid ejection head sufficiently and affect the ejection of the liquid. The deformation of the pressure chamber walls 50 becomes noticeable as the wall width thereof becomes narrower and the length of the pressure chambers 10 in the long side direction becomes longer. Use of a resin having low rigidity for the pressure chamber wall member 5 is also a factor that makes the pressure chamber walls 50 likely to deform.

FIGS. 3A to 3E illustrate an example of the liquid ejection head according to the present embodiment. Similarly to the above-described liquid ejection head according to the comparison example, the pressure chamber wall member 5 is formed of a photosensitive material such as a photosensitive resin. A photosensitive resin is desirably used from the viewpoint of improving the working accuracy. A photosensitive epoxy resin is more desirably used from the viewpoint of heat resistance.

Figure 3C:
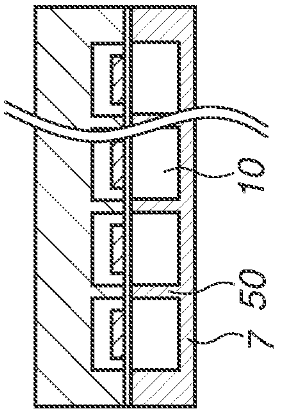
FIGS. 3C and 3D are views illustrating an example of the liquid ejection head according to the embodiment in a middle of a manufacturing process thereof.
Figure 3B:
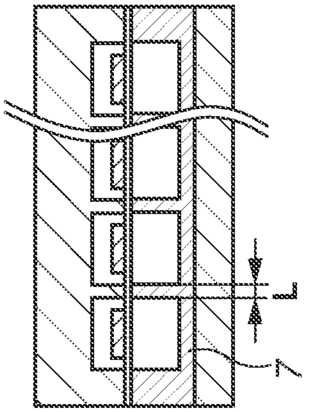
FIGS. 3A and 3B are cross-sectional views illustrating an example of the liquid ejection head according to the embodiment.
Figure 3A:
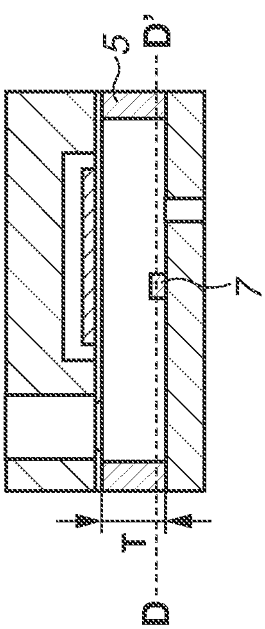
Figure 3E:
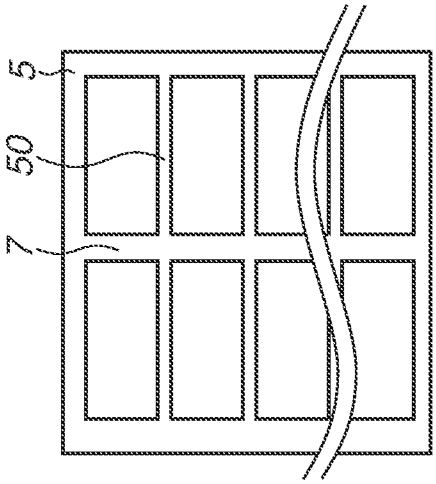
FIG. 3E is a cross-sectional view illustrating a pressure chamber wall member of the liquid ejection head according to the embodiment.
Figure 3D:
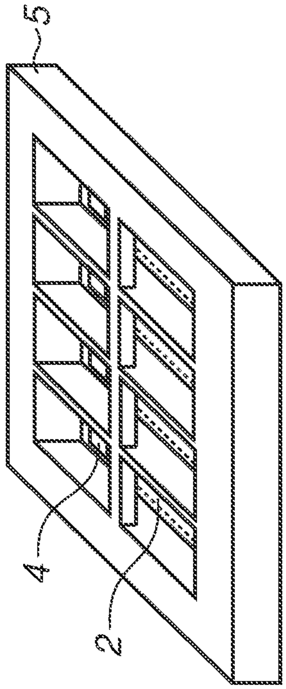

FIG. 3A is a cross-sectional view taken along a line A-A' in FIG. 1 and viewed in a direction parallel to the long side direction of the pressure chambers 10. FIG. 3B is a cross-sectional view taken along a line B-B' in FIG. 1. FIG. 3D is a perspective view illustrating the pressure chamber wall member 5 viewed from the surface thereof bonded to the nozzle plate 6. FIG. 3E is a cross-sectional view taken along a line D-D' in FIG. 3A, which illustrates only the pressure chamber wall member 5.

In the liquid ejection head according to the present embodiment, a structure 7 for connecting at least two side surfaces among four side surfaces (the pressure chamber walls 50) forming each pressure chamber 10 (each space) is provided. FIG. 3B illustrates a state where the pressure chamber walls 50 are supported by the structure 7. It is possible to obtain an effect of suppressing the deformation of the pressure chamber wall member 5 by providing the structure 7. This configuration makes it easier to reduce the thickness of the pressure chamber walls 50, thereby producing an effect that the nozzles 11 can be arranged in a more highly-integrated manner.

In FIGS. 3A to 3E, the structure 7 is formed integrally with the pressure chamber wall member 5. By forming the structure 7 integrally with the pressure chamber wall member 5 using the same resin (the same material) as that used for the pressure chamber wall member 5, high working accuracy can be obtained, and the manufacturing process can also be simplified. Alternatively, the structure 7 can be a member different from the pressure chamber wall member 5.

FIG. 3C illustrates an example of the liquid ejection head according to the present embodiment in the middle of the manufacturing process, and illustrates a state where the pressure chamber wall member 5 is connected to the substrate 1. The deformation of the pressure chamber wall member 5 (the pressure chamber walls 50) is suppressed by the structure 7 connecting the pressure chamber walls 50, compared to the comparison example illustrated in FIG. 2C.

As illustrated in FIGS. 3A to 3E, it is desirable that the pressure chamber walls 50 between the spaces be continuously connected by the structure 7 in the short side direction of the pressure chambers 10. In this case, the structure 7 has a high deformation suppressing effect with respect to size, and is desirable for increasing the density of the nozzles 11. As illustrated in FIGS. 3A and 3B, the height of the pressure chambers 10 is defined as T, and the thickness of the pressure chamber walls 50 between the pressure chambers 10 adjacent to each other in the short side direction (the thickness of the pressure chamber wall member 5) is defined as L. As a result of forming the pressure chamber wall member 5 using an epoxy resin-based negative-type photosensitive material, the inventors have found that the deformation of the pressure chamber walls 50 after the development of the photosensitive resin is noticeable with an aspect ratio of T/L>6. Thus, as the ratio of T increases, the working accuracy tends to be lower, and the occurrence rate of large deformation of the pressure chamber walls 50 in the manufacturing of the liquid ejection head tends to be higher. Providing the structure 7 according to the present embodiment can suppress the deformation of the pressure chamber walls 50. Providing the structure 7 is thus desirable because the effect of suppressing the lowering of the working accuracy and the effect of suppressing the deformation of the pressure chambers 10 according to the present embodiment are increased as the ratio of T increases in the aspect ratio of L:T. The ratio of T to L desirably satisfies a relationship of T/L>1, and more desirably satisfies a relationship of T/L>2, which is higher than a generally-used dimensional ratio of L:T=1:2. Even more desirably, the ratio of T to L satisfies a relationship of T/L>4, which allows the integration degree of the nozzles 11 to be doubled in a general structure. Furthermore, the present embodiment can be suitably applied even when the ratio is T/L>6, where the issue of the deformation after the development is likely to be significant.

FIGS. 4A to 4E illustrate various arrangement examples of the structure 7 in the liquid ejection head according to the present embodiment, and the effect of suppressing the deformation of the pressure chamber walls 50 by using the structure 7 can be obtained in any of the illustrated configurations. As illustrated in FIGS. 4A to 4E, each nozzle 11 can have a multistage structure.

Figure 4A:
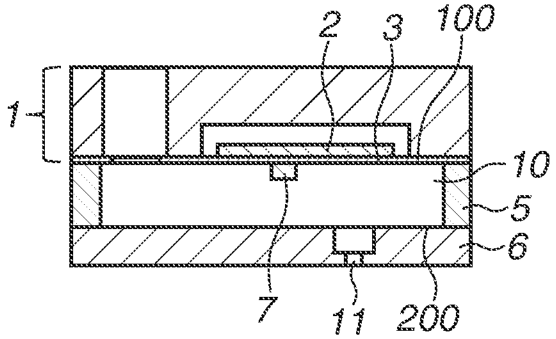
FIGS. 4A, 4B, 4C, 4D, and 4E are cross-sectional views illustrating examples of the liquid ejection head according to the embodiment.

As illustrated in FIG. 4A, a first surface 100 of each pressure chamber 10 is in contact with the corresponding vibration plate 3, and a second surface 200 of each pressure chamber 10 is in contact with the nozzle plate 6. The first surface 100 is the surface of each pressure chamber 10 on the side where the piezoelectric elements 2 are located, whereas the second surface 200 is the surface of each pressure chamber 10 on the side where the nozzle plate 6 is located. In FIG. 4A, the structure 7 is arranged in contact with the first surface 100. As illustrated in FIG. 4A, in a case where the structure 7 is arranged to face the piezoelectric elements 2 via the vibration plates 3, the structure 7 may affect the operation of the vibration plates 3 when the piezoelectric elements 2 are driven, although the effect of suppressing the deformation of the pressure chamber walls 50 can be obtained. Thus, in a case where the structure 7 is arranged on the first surface 100, it is desirable that the structure 7 be arranged at a position off-set from the piezoelectric elements 2.

Figure 4B:
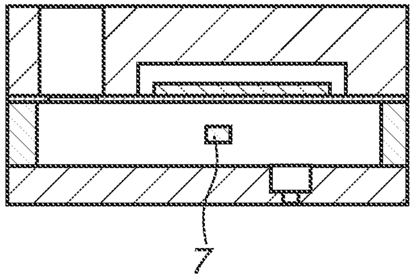

In FIG. 4B, the structure 7 is arranged at a position away from both of the first surface 100 and the second surface 200. In this case, the operation of the vibration plates 3 is less affected when the piezoelectric elements 2 are driven, and the effect of suppressing deformation of the pressure chamber walls 50 is also obtained. Thus, this configuration is desirable compared to the configuration in which the structure 7 is arranged on the first surface 100.

Figure 4C:
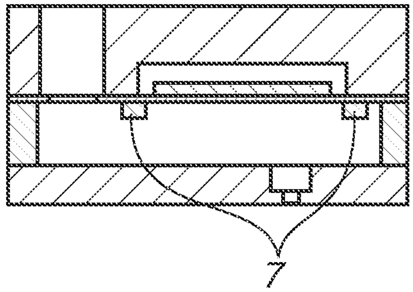
Figure 4D:
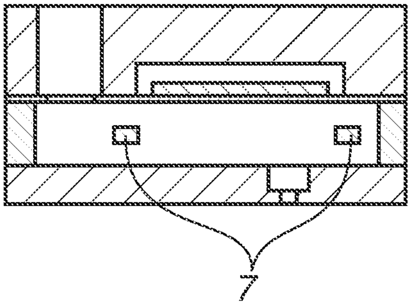
Figure 4E:
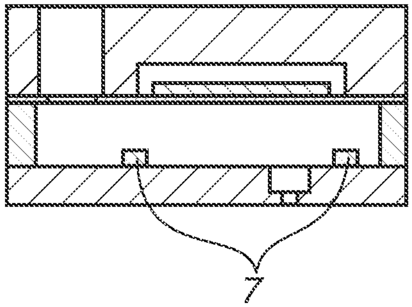

In FIG. 4C, the structure 7 is arranged on the first surface 100 at positions corresponding to both ends of the piezoelectric elements 2 in the long side direction of the pressure chambers 10. Because the structure 7 is arranged at positions off-set from the piezoelectric elements 2, it is possible to obtain the effect of suppressing the deformation of the pressure chamber walls 50 without much affecting the operation of the vibration plates 3 when the piezoelectric elements 2 are driven. Because the structure 7 is arranged at both ends of the piezoelectric elements 2, it is also possible to obtain an effect of concentrating the pressure of the liquid on the nozzles 11. In FIG. 4D, the structure 7 is arranged to face both ends of the piezoelectric elements 2 at positions away from both of the first surface 100 and the second surface 200. In FIG. 4E, the structure 7 is arranged on the second surface 200 at positions facing both ends of the piezoelectric elements 2. As illustrated in FIGS. 4C to 4E, by arranging the structure 7 at both ends of the piezoelectric elements 2 in the long side direction in a planar view in a direction perpendicular to the substrate 1, it is possible to reduce an influence on the operation of the piezoelectric elements 2 and the vibration plates 3 while obtaining the effect of suppressing the deformation of the pressure chamber walls 50. This configuration is more desirable because the effect of concentrating the pressure of the liquid on the nozzles 11 can also be obtained.

Figure 5A:
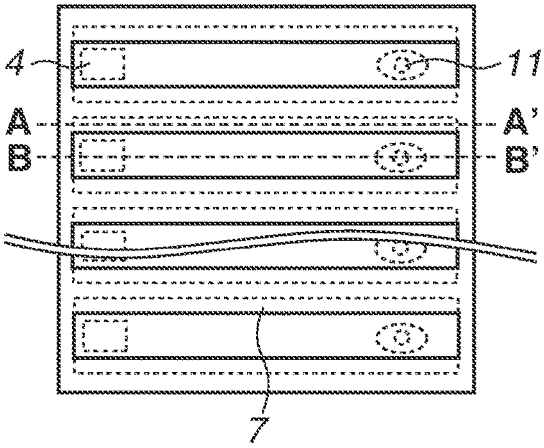
FIG. 5A is a cross-sectional view illustrating an example of the liquid ejection head according to the embodiment.
Figure 5D:
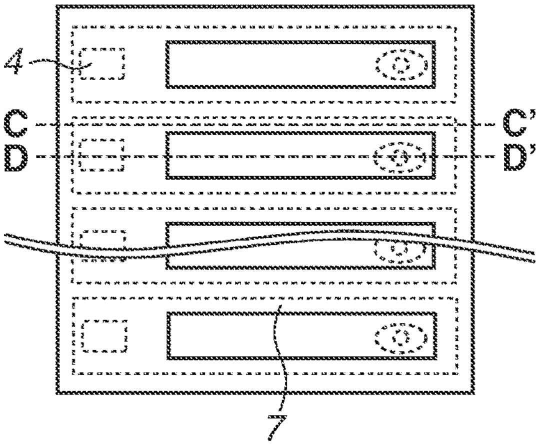
FIG. 5D is a cross-sectional view illustrating an example of the liquid ejection head according to the embodiment.
Figure 5B:
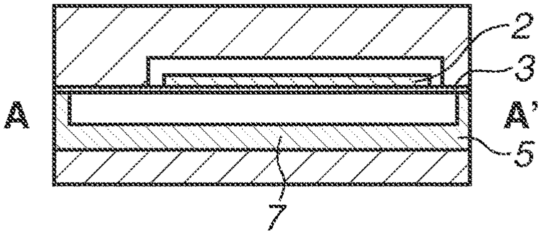
FIG. 5B is a cross-sectional view taken along a line A-A' in FIG. 5A.
Figure 5E:
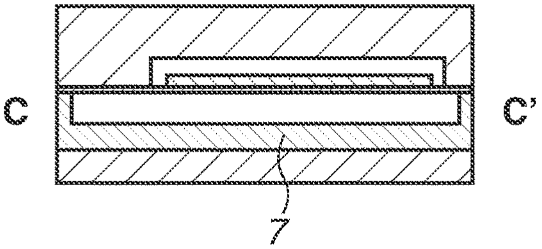
FIG. 5E is a cross-sectional view taken along a line C-C' in FIG. 5D.
Figure 5C:
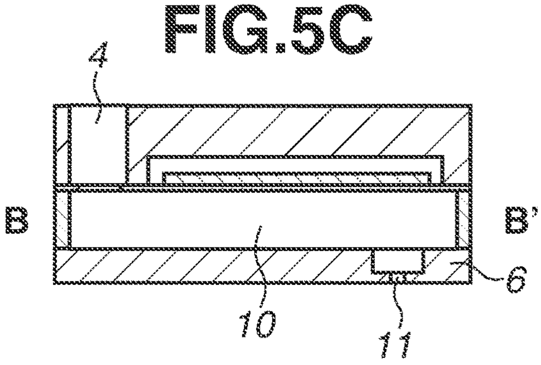
FIG. 5C is a cross-sectional view taken along a line B-B' in FIG. 5A.

FIGS. 5A to 5I illustrate another configuration example of the liquid ejection head according to the present embodiment. As illustrated in FIGS. 5A to 5C, the deformation can be suppressed by using the structure 7 to reinforce the pressure chamber walls 50 in the long side direction. FIG. 5A is a cross-sectional view at a position corresponding to a line D-D' in FIG. 3A, FIG. 5B is a cross-sectional view taken along a line A-A' in FIG. 5A, and FIG. 5C is a cross-sectional view taken along a line B-B' in FIG. 5A.

Figure 5F:
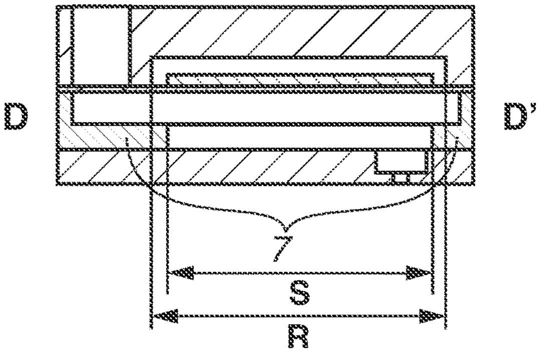
FIG. 5F is a cross-sectional view taken along a line D-D' in FIG. 5D.

As illustrated in FIGS. 5D to 5F, the structure 7 reinforces the pressure chamber walls 50 in the long side direction, and also continuously connects the pressure chamber walls 50 in the short side direction. This configuration makes it possible to increase the effect of suppressing the deformation of the pressure chamber walls 50. FIG. 5D is a cross-sectional view at a position corresponding to a line D-D' in FIG. 3A, FIG. 5E is a cross-sectional view taken along a line C-C' in FIG. 5D, and FIG. 5F is a cross-sectional view taken along a line D-D' in FIG. 5D. In the planar view in the direction perpendicular to the substrate 1, an area of the vibration plate 3 corresponding to each pressure chamber 10 and each piezoelectric element 2 is defined as an effective vibration area. Further, the length of the effective vibration area in the long side direction is defined as R, and the length of a portion not overlapping with the structure 7 in the length R in the long side direction is defined as S. Considering the effect of suppressing the deformation of the pressure chamber walls 50 and the efficiency of transmitting the ejection pressure of the liquid to the nozzles 11, the ratio of S to R is desirably 30% or more and 90% or less, and is more desirably 50% or more and 70% or less.

Figure 5G:
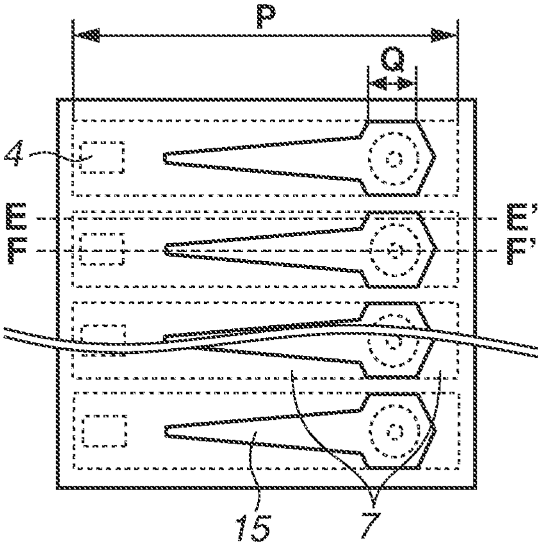
FIG. 5G is a cross-sectional view illustrating an example of the liquid ejection head according to the embodiment.
Figure 5H:
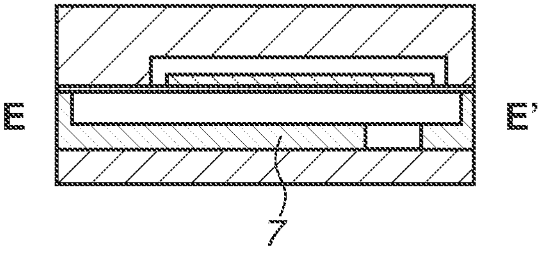
FIG. 5H is a cross-sectional view taken along a line E-E' in FIG. 5G.
Figure 5I:
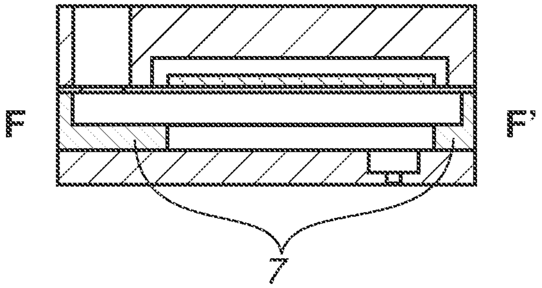
FIG. 5I is a cross-sectional view taken along a line F-F' in FIG. 5G.

As illustrated in FIGS. 5G to 5I, a length Q of a portion not having the structure 7 can be included in a length P of the pressure chambers 10 in the long side direction. FIG. 5G is a cross-sectional view at a position corresponding to a line D-D' in FIG. 3A, FIG. 5H is a cross-sectional view taken along a line E-E' in FIG. 5G, and FIG. 5I is a cross-sectional view taken along a line F-F' in FIG. 5G. Because the pressure applied to the liquid is partially released to the outside through the nozzles 11, it is possible to increase the effect of suppressing the deformation of the pressure chamber walls 50 by arranging the portion having the length Q that does not have the structure 7 so as to be adjacent to each nozzle 11. Further, design restrictions due to the structure 7 are reduced, so that an effect of increasing the degree of freedom in design of the nozzles 11 can be obtained. The effect of suppressing the deformation of the pressure chamber walls 50 increases as the ratio of Q to P decreases. The ratio of Q to P is desirably 90% or less and is more desirably 70% or less. Even more desirably, the ratio of Q to P is 50% or less. Further, the ratio of a portion where the structure 7 and each pressure chamber 10 overlap with each other is desirably decreased from the side of the liquid supply ports 4 toward the side of the nozzles 11 in the planar view in the direction perpendicular to the substrate 1. In this case, it is possible to obtain an effect of increasing the ability to concentrate the ejection pressure, which is applied to the liquid from the piezoelectric elements 2, on the nozzles 11. The effect increases as the ratio of the length of the structure 7 to the length of the pressure chambers 10 (the spaces) in the long side direction increases. The ratio is desirably 20% or more and is more desirably 30% or more. Even more desirably, the ratio is 40% or more.

Figure 6A:
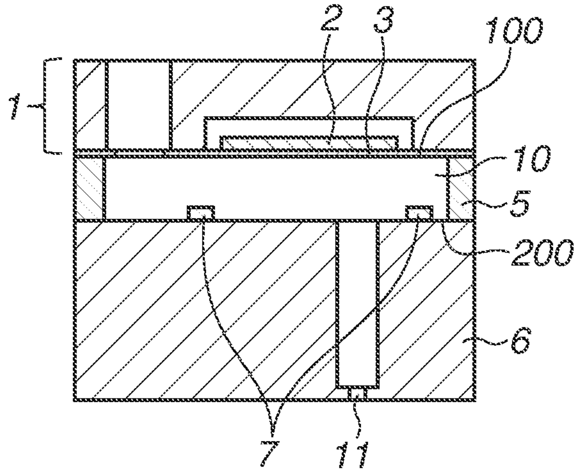
FIGS. 6A, 6B, 6C, and 6D are cross-sectional views illustrating examples of the liquid ejection head according to the embodiment.

FIGS. 6A to 6D illustrate another example of the liquid ejection head according to the present embodiment. As illustrated in FIG. 6A, the effect of the structure 7 can also be obtained even if the height of the nozzles 11 in the direction perpendicular to the substrate 1 is high.

Figure 6B:
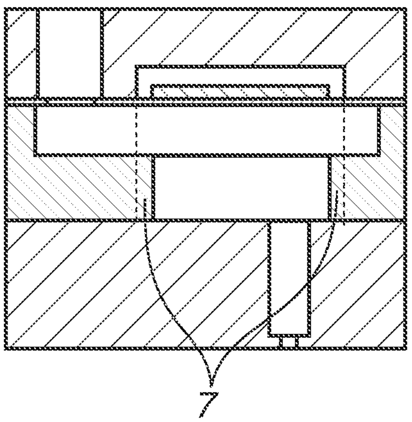

FIG. 6B illustrates a state where the structure 7 is integrated with the pressure chamber wall member 5. Also in this case, the effect from providing the structure 7 can be obtained. The structure 7 is a member that reinforces the pressure chamber walls 50. In a case where the structure 7 is integrated with the pressure chamber walls 50, a portion facing each vibration plate 3 in the pressure chamber wall member 5 is regarded as the structure 7.

Figure 6C:
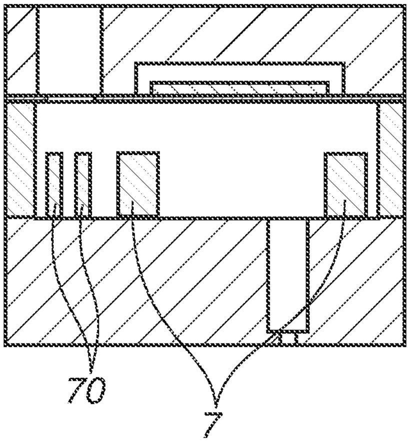

FIG. 6C illustrates the liquid ejection head including the structure 7 and a structure 70 that also serves as a damper having a liquid vibration suppressing effect for preventing crosstalk. By adding a function other than a function of supporting the pressure chamber walls 50 to the structure 7, it is possible to obtain an effect of reducing the number of members and an effect of easily manufacturing the liquid ejection head.

Figure 6D:
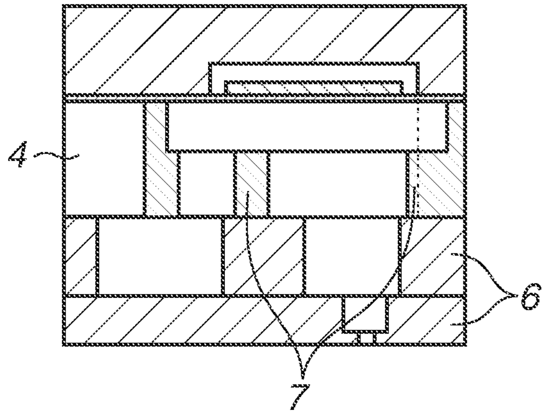

FIG. 6D illustrates a configuration of the liquid ejection head including the structure 7, the nozzle plate 6 formed of a plurality of members, and the pressure chamber wall member 5 in which the liquid supply ports 4 are arranged. Also in this configuration, the structure 7 functions to support the pressure chamber walls 50 and provides the effect of concentrating the pressure applied to the liquid from the piezoelectric elements 2 on the nozzles 11.

The effects according to the present embodiment can also be obtained even in a case where the liquid ejection head internally circulates the liquid as illustrated in FIGS. 7A to 7G. The substrate 1 includes a liquid supply port 4*a* for supplying the liquid to each pressure chamber 10 and a liquid outlet port 4*b* for flowing the liquid out of each pressure chamber 10. In each example of the liquid ejection head according to the present embodiment illustrated in FIGS. 7A to 7G, the structure 7 continuously connects the pressure chamber walls 50 in the short side direction.

Figures 7A, 7B, 7C, 7D, 7E, 7F, 7G:
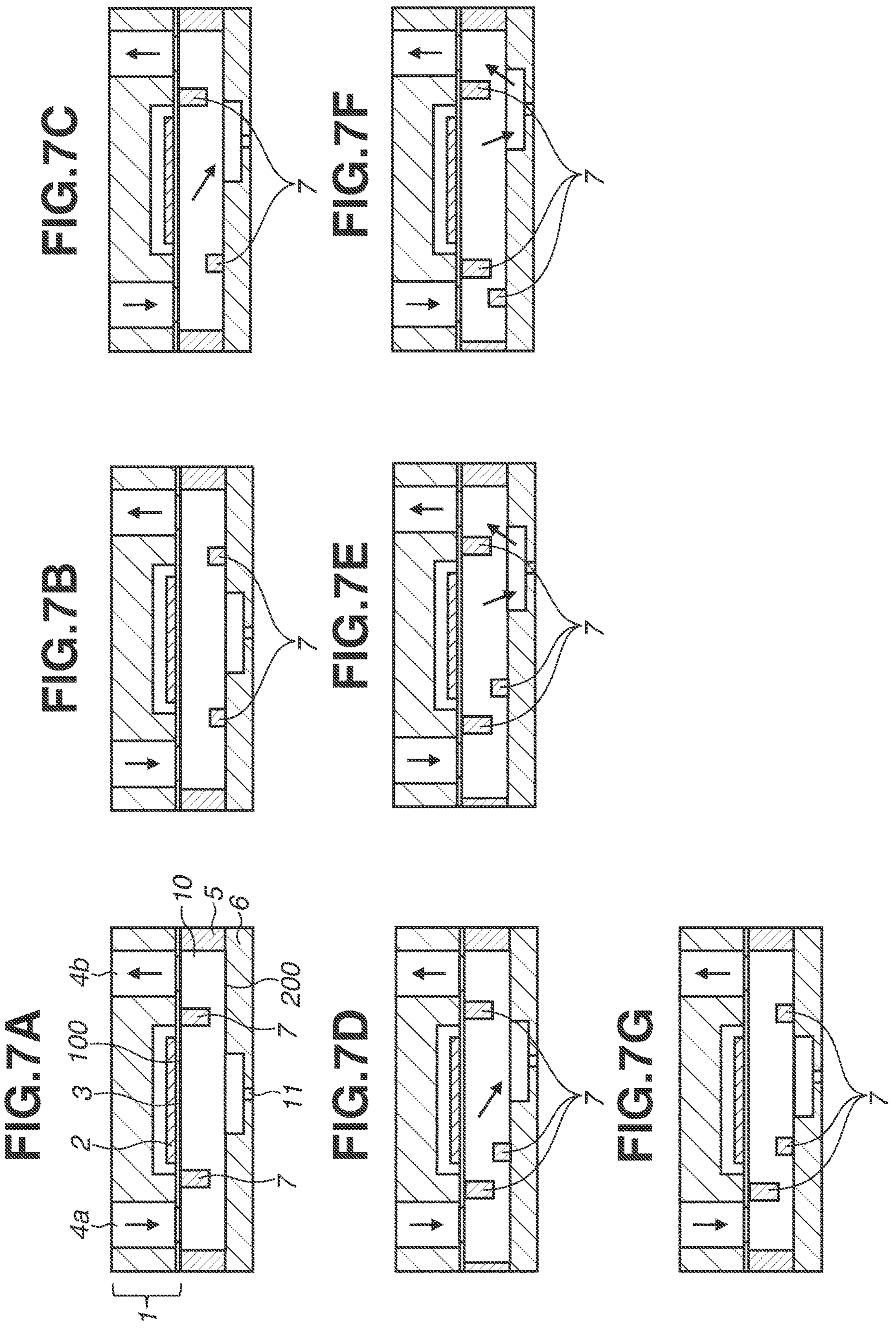
FIGS. 7A, 7B, 7C, 7D, 7E, 7F, and 7G are cross-sectional views illustrating examples of the liquid ejection head according to the embodiment.

In FIG. 7A, the structure 7 is arranged on the first surface 100 at positions corresponding to both ends of the piezoelectric elements 2. In FIG. 7B, the structure 7 is arranged on the second surface 200 at positions corresponding to both ends of the piezoelectric elements 2. The structure 7 similarly has the effect of suppressing the deformation of the pressure chamber walls 50 in both of the above-described configurations, but the configuration illustrated in FIG. 7A is desirable because the efficiency of circulating the liquid inside each nozzle 11 is higher.

In FIG. 7C, in a liquid circulation direction, the structure 7 is arranged on the second surface 200 at a position corresponding to the end of each piezoelectric element 2 closer to the liquid supply port 4*a* than the nozzle 11, and is also arranged on the first surface 100 at a position corresponding to the end of each piezoelectric element 2 closer to the liquid outlet port 4*b* than the nozzle 11. With this configuration, an effect of promoting circulation of the liquid inside the nozzle 11 can be obtained. The arrangement of each nozzle 11 can be adjusted between the structure 7 on the front side and the structure 7 on the rear side. In FIG. 7D, the liquid ejection head includes another structure 7 that is in contact with the first surface 100 at a position closer to the liquid supply port 4*a* than the structure 7 that is in contact with the second surface 200 at a position closer to the liquid supply port 4*a* than the nozzle 11, in addition to the configuration illustrated in FIG. 7C. In other words, in the liquid circulation direction, the liquid ejection head includes the structure 7 that is in contact with the first surface 100 at a position closer to the liquid supply port 4*a* than the nozzle 11 and the structure 7 that is in contact with the second surface 200 at a position closer to the liquid supply port 4*a* than the nozzle 11. By adjusting the arrangement of the structures 7, it is also possible to obtain an effect of efficiently adjusting the liquid resistance on the side of the liquid supply port 4*a*. In FIG. 7E, the nozzle 11 partially extends toward the liquid outlet port 4*b* beyond the structure 7 on the side of the liquid outlet port 4*b*. This configuration makes it possible to obtain an effect of improving the efficiency of circulating the liquid inside the nozzle 11. In FIG. 7F, the nozzle 11 partially extends toward the liquid outlet port 4*b* beyond the structure 7 on the side of the liquid outlet port 4*b*. This configuration makes it possible to obtain the effect of improving the efficiency of circulating the liquid inside the nozzle 11. Furthermore, the liquid ejection head in FIG. 7F includes the structure 7 that is in contact with the first surface 100 at a position on the rear side of the liquid supply port 4*a*, and the structure 7 that is in contact with the second surface 200 at a position facing the liquid supply port 4*a*. This configuration makes it possible to obtain an effect of adjusting the liquid resistance in an area away from the nozzle 11.

FIGS. 8A to 8E illustrate an example of a manufacturing method of the liquid ejection head according to the present embodiment. Respective processes described below can be performed by using known techniques.

Figure 8A:
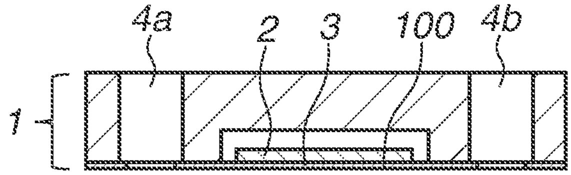
FIGS. 8A, 8B, 8C, 8D, and 8E are views illustrating processes in an example of a manufacturing method of the liquid ejection head according to the embodiment.

As illustrated in FIG. 8A, the substrate 1 including the piezoelectric elements 2 is prepared. In FIG. 8A, the substrate 1 further includes the vibration plates 3, the liquid supply ports 4*a*, and the liquid outlet ports 4*b*.

Figure 8B:
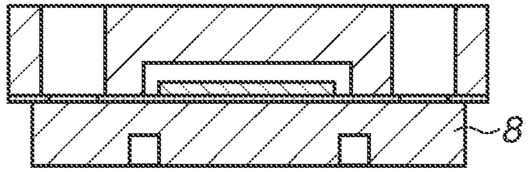

Next, as illustrated in FIG. 8B, a mold member 8 is formed on the substrate 1. A photosensitive material mainly containing a novolac resin or an acrylic resin can be used as the material of the mold member 8. Alternatively, cyclized rubber can be used. To form the mold member 8 using the photosensitive material, exposure conditions are changed depending on the area. This makes it possible to form a portion penetrating to the first surface 100 of the substrate 1 and a portion not penetrating to the first surface 100 during development. The portion not penetrating to the first surface 100 is a portion corresponding to the structure 7 in forming the pressure chamber wall member 5.

Figure 8C:
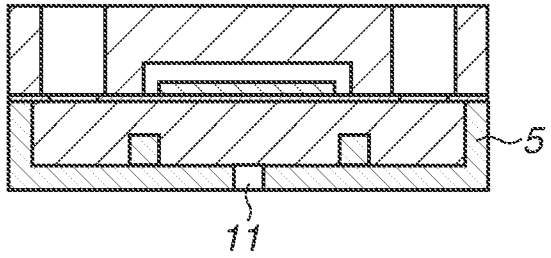

Next, as illustrated in FIG. 8C, the pressure chamber wall member 5 is formed on the mold member 8 by using the photosensitive resin. The pressure chamber wall member 5 can be formed using a method such as a spin-coating method, a slit-coating method, a spray-coating method, a nano-imprinting method, a dipping method, or a formation method using a dry film. Subsequently, the nozzles 11 are formed through exposure and development using a mask. When the pressure chamber wall member 5 is formed on the mold member 8, flatness of the pressure chamber wall member 5 may be deteriorated because of asperities on the mold member 8. In this case, planarization processing such as polishing can additionally be performed after the pressure chamber wall member 5 is formed.

Figure 8D:
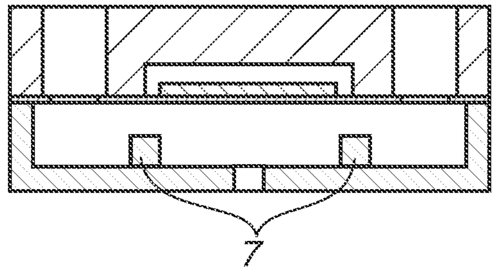

Next, as illustrated in FIG. 8D, the mold member 8 is removed. The mold member 8 can be removed using dry processing or wet processing, but the wet processing is desirable because the selectivity ratio to the pressure chamber wall member 5 can be easily improved. The pressure chamber wall member 5 including the structure 7 is formed by the removal of the mold member 8. In the liquid ejection head illustrated in FIGS. 8A to 8E, the nozzle plate 6 and the pressure chamber wall member 5 are integrated with each other.

Figure 8E:
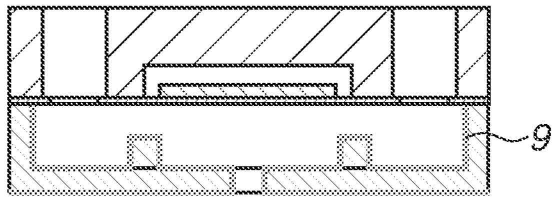

As illustrated in FIG. 8E, a function film 9 can further be formed on the pressure chamber wall member 5 and the structure 7. The function film 9 can be formed on a portion other than the pressure chamber wall member 5 and the structure 7.

From the viewpoint of liquid ejection, it is desirable that a film capable of enhancing the strength of the pressure chamber wall member 5 be used as the function film 9. The function film 9 can also be used as a protection film that prevents damage during the manufacturing process and improves resistance to the liquid that the liquid ejection head is in contact with, or a film that adjusts an affinity for the liquid. Furthermore, the function film 9 can be a laminated film including films having the above-described functions. It is desirable that a material having a Young's modulus of 50 GPa or more be used as the material of the function film 9 in order to enhance the strength of the pressure chamber wall member 5. Generally, the Young's modulus of resins is lower than that of metals. It is reported that an epoxy resin has a Young's modulus of approximately 2 GPa, and even a resin having a high Young's module has a value less than 5 GPa. Thus, if the Young's modulus of the function film 9 is 50 GPa, the value is greater than or equal to ten times the value of a resin having a high Young's modulus. Materials such as stainless steel, nickel (Ni), iridium (Ir), tantalum (Ta), tungsten (W), molybdenum (Mo), chromium (Cr), cobalt (Co), iron (Fe), ruthenium (Ru), silicon carbide (SiC), titanium carbide (TiC), tungsten carbide (WC), boron carbide ($B_4C$), zirconium oxide ($ZrO_2$), aluminum oxide ($Al_2O_3$), tantalum oxide ($Ta_2O_5$), aluminum nitride (AlN), silicon nitride ($Si_3N_4$), titanium nitride (TiN), and diamond can be used for the function film 9.

A film formation method such as a physical vapor deposition (PVD) method, an atomic layer deposition (ALD) method, or a chemical vacuum deposition (CVD) method can be used to form the function film 9. In the PVD method, sputtering, vacuum deposition, molecular beam epitaxy, laser deposition, electron beam evaporation, and the like can be used. In the CVD method, various methods using heat, plasma, an electromagnetic wave, and a catalyst can be used in combination. Alternatively, wet processing such as plating can be used. The function film 9 can also be formed by using the above-described film formation methods in combination. Processing using heat, an electromagnetic wave, an electron beam or plasma can also be performed after the formation of the function film 9. The wet processing has a risk of causing defects due to bubble entrapment or the like. Thus, considering film formation on a microscopic structure such as the pressure chamber wall member 5 according to the present embodiment, even if the defects can be reduced by repeating film formation and cleaning, the wet processing is not desirable from the viewpoint of film thickness control. Thus, film formation methods, such as the PVD method, the CVD method, and the ALD method, which are less likely to cause defects are desirably used. Among these, the CVD method is more desirable from the viewpoint of coatability, and the ALD method that is excellent in step coverage on a microscopic structure is even more desirable. In a case where the function film 9 is to be selectively formed on a surface of the nozzle plate 6, the PVD method, which is a film formation method having high directivity, is desirably used. Especially, the PVD method, such as the vacuum deposition, the molecular beam epitaxy, the laser deposition, or the electron beam evaporation, capable of easily increasing the degree of vacuum in film formation is more desirable.

FIGS. 9A to 9F illustrate another example of the manufacturing method of the liquid ejection head according to the present embodiment. Respective processes described below can be performed by using known techniques.

Figure 9A:
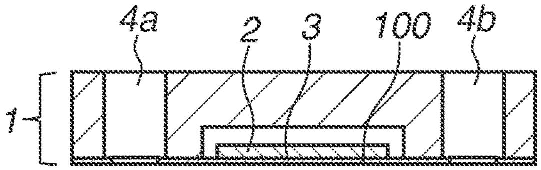
FIGS. 9A, 9B, 9C, 9D, 9E, and 9F are views illustrating processes in another example of the manufacturing method of the liquid ejection head according to the embodiment.

As illustrated in FIG. 9A, the substrate 1 including the piezoelectric elements 2 is prepared. In FIG. 9A, the substrate 1 further includes the vibration plates 3, the liquid supply ports 4*a*, and the liquid outlet ports 4*b*.

Figure 9B:
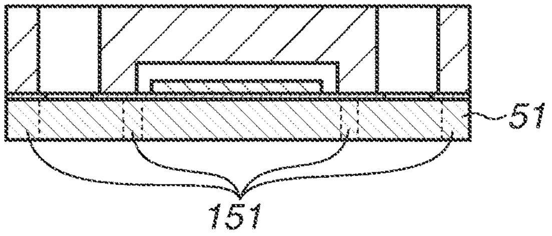

Next, as illustrated in FIG. 9B, a first pressure chamber wall member 51 is formed on the substrate 1 by using a photosensitive resin. Latent images of portions 151 corresponding to the pressure chamber wall member 5 are formed through exposure using a mask.

Figure 9C:
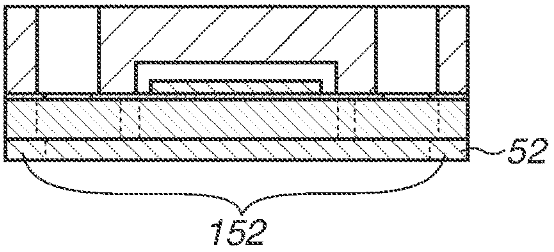

Next, as illustrated in FIG. 9C, a second pressure chamber wall member 52 is formed on the first pressure chamber wall member 51 by using a photosensitive resin. Latent images of portions 152 corresponding to the pressure chamber wall member 5 are formed through exposure using a mask. When the second pressure chamber wall member 52 is to be formed, a photosensitive resin or an exposure condition that can protect the first pressure chamber wall member 51 from being affected by the exposure in forming the second pressure chamber wall member 52 is selected by using a known technique.

Figure 9D:
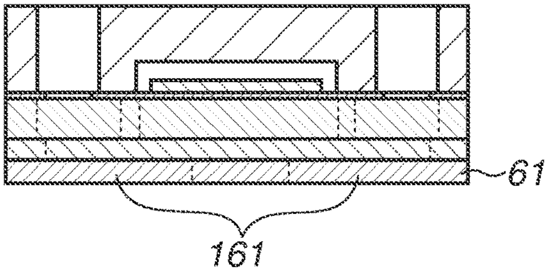

Subsequently, as illustrated in FIG. 9D, a first nozzle plate member 61 is formed. Latent images of portions 161 corresponding to the nozzle plate 6 are formed through exposure using a mask. When the first nozzle plate member 61 is to be formed, a photosensitive resin or an exposure condition that can protect the pressure chamber wall member 5 from being affected by the exposure is selected by using a known technique.

As described above, by forming the latent images using photolithography to form the pressure chamber wall member 5 and the first nozzle plate member 61, it is possible to obtain an effect of easily improving the flatness and thickness accuracy of the members to be formed, compared to the case where the mold member 8 is used. It is possible to build the pressure chamber wall member 5 and the structure 7 by integrally forming the first pressure chamber wall member 51 and the second pressure chamber wall member 52 into one layer and partially changing the exposure conditions. However, in this case, working accuracy in the height direction may deteriorate because of variations in the exposure conditions. Thus, as described in the present embodiment, it is possible to obtain an effect of easily improving the working accuracy of the structure 7 by forming the pressure chamber wall member 5 using two or more layers of a photosensitive resin.

Figure 9E:
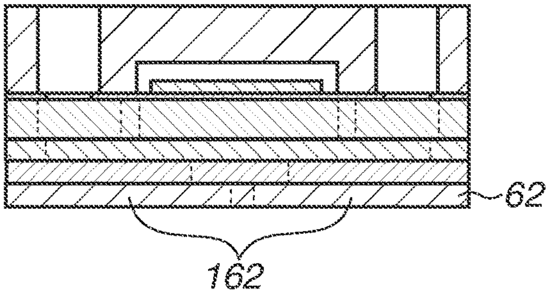

Subsequently, as illustrated in FIG. 9E, a second nozzle plate member 62 is formed. Latent images of portions 162 corresponding to the nozzle plate 6 are formed through exposure using a mask. When the second nozzle plate member 62 is to be formed, a photosensitive resin or an exposure condition that can protect the pressure chamber wall member 5 and the first nozzle plate member 61 from being affected by the exposure is selected by using a known technique.

Figure 9F:
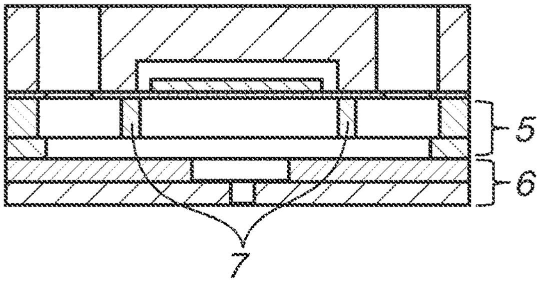

Next, as illustrated in FIG. 9F, the plurality of layers is collectively developed, so that the pressure chamber wall member 5, the nozzle plate 6, and the structure 7 are formed. As described above, the function film 9 can be formed on the pressure chamber wall member 5 and the structure 7.

FIGS. 10A to 10F illustrate another example of the manufacturing method of the liquid ejection head according to the present embodiment. Respective processes described below can be performed by using known techniques.

Figure 10A:
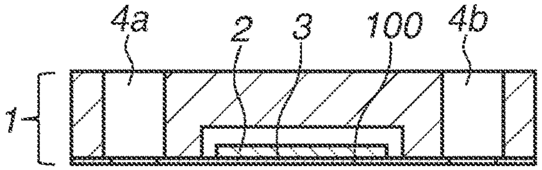
FIGS. 10A, 10B, 10C, 10D, 10E, and 10F are views illustrating processes in another example of the manufacturing method of the liquid ejection head according to the embodiment.

As illustrated in FIG. 10A, the substrate 1 including the piezoelectric elements 2 is prepared. In FIG. 10A, the substrate 1 further includes the vibration plates 3, the liquid supply ports 4*a*, and the liquid outlet ports 4*b*.

Figure 10B:
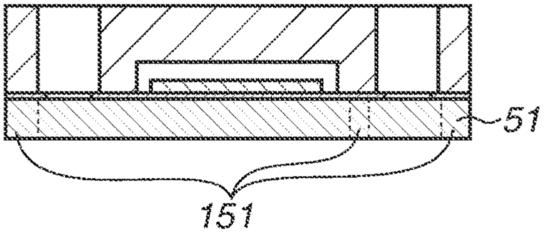

Next, as illustrated in FIG. 10B, the first pressure chamber wall member 51 is formed on the substrate 1 by using a photosensitive resin. The latent images of the portions 151 corresponding to the pressure chamber wall member 5 are formed through exposure using a mask.

Figure 10C:
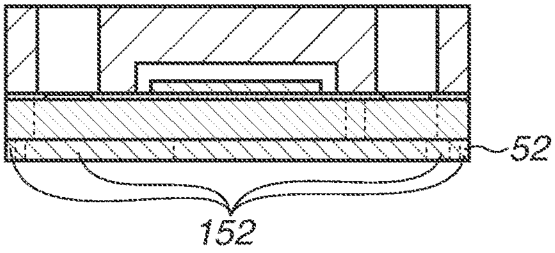

Next, as illustrated in FIG. 10C, the second pressure chamber wall member 52 is formed. The latent images of the portions 152 corresponding to the pressure chamber wall member 5 are formed through exposure using a mask. When the second pressure chamber wall member 52 is to be formed, a photosensitive resin or an exposure condition that can protect the first pressure chamber wall member 51 from being affected by the exposure in forming the second pressure chamber wall member 52 is selected by using a known technique.

Figure 10D:
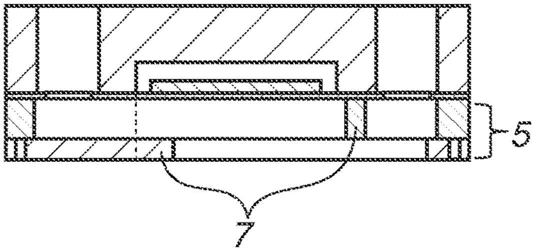

Next, as illustrated in FIG. 10D, the plurality of layers is collectively developed, so that the pressure chambers 10 and the structures 7 are formed.

Figure 10E:
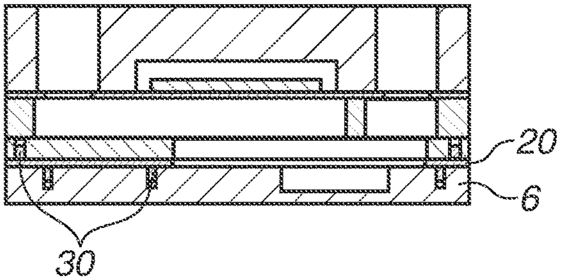

Next, as illustrated in FIG. 10E, the nozzle plate 6 is bonded to the pressure chamber wall member 5 by using an adhesive agent 20. At this time, as illustrated in FIG. 10E, a recessed portion 30 can be formed on at least one of the pressure chamber wall member 5 and the nozzle plate 6. The recessed portion 30 can be used as an adhesive agent storage hole for preventing the adhesive agent 20 from squeezing out. By forming the recessed portion 30 on the pressure chamber wall member 5 made of a photosensitive resin, it is possible to obtain an effect of improving dimensional accuracy of the adhesive agent storage hole. The recessed portion 30 can be formed into a known shape, such as a combination of a circle, an oval, a square, a rectangle, and a triangle, or a hole or a groove having a shape surrounded by a curved line.

Figure 10F:
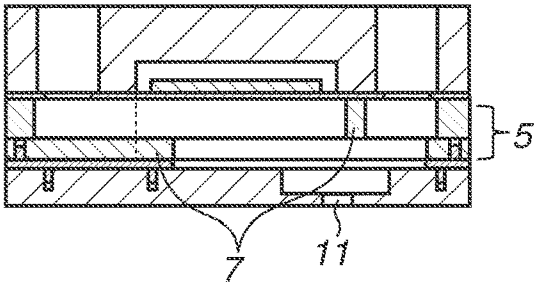

Next, as illustrated in FIG. 10F, the nozzles 11 are formed to penetrate the nozzle plate 6. As described above, the function film 9 can be formed on the pressure chamber wall member 5 and the structure 7.

Another example of the manufacturing method of the liquid ejection head according to the present embodiment will be described with reference to FIGS. 11A to 13B. Respective processes described below can be performed by using known techniques.

Figure 11C:
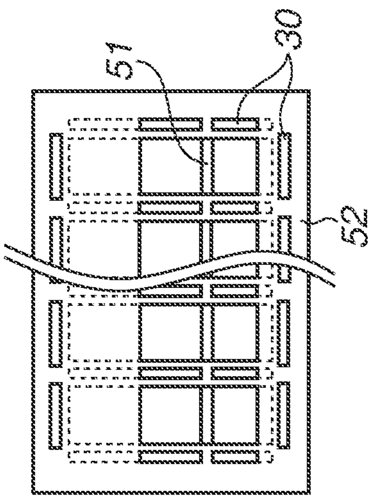
FIG. 11C is a view illustrating the pressure chamber wall member in another example of the manufacturing method of the liquid ejection head according to the embodiment.
Figure 11B:
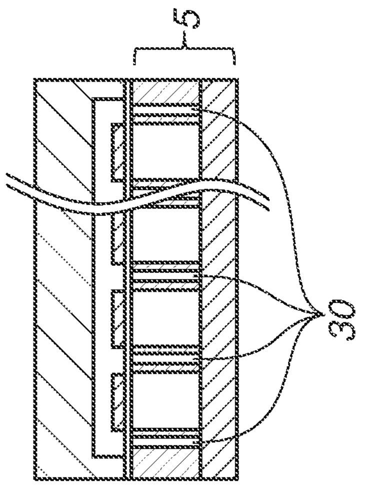
FIG. 11B is a cross-sectional view taken along a line A-A' in FIG. 11A.
Figure 11A:
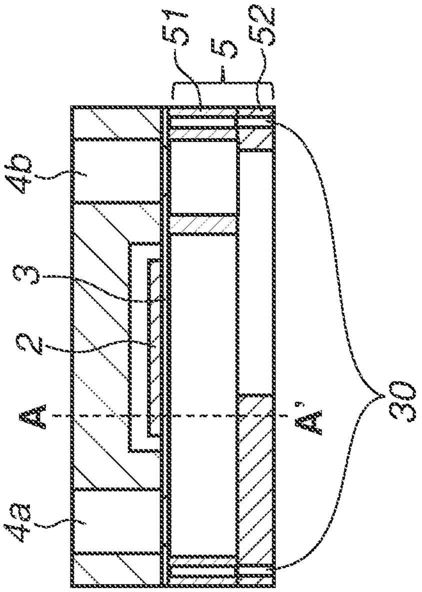
FIG. 11A is a view illustrating processes in another example of the manufacturing method of the liquid ejection head according to the embodiment.

First, as illustrated in FIG. 11A, the pressure chamber wall member 5 including the first pressure chamber wall member 51 and the second pressure chamber wall member 52 is formed on the substrate 1 including the piezoelectric elements 2, the vibration plates 3, the liquid supply ports 4*a*, and the liquid outlet ports 4*b*. The pressure chamber wall member 5 can be formed in the processes similar to those illustrated in FIGS. 10A to 10D. FIG. 11B is a cross-sectional view taken along a line A-A' in FIG. 11A, and FIG. 11C is a plan view illustrating the pressure chamber wall member 5 viewed from a side of the second pressure chamber wall member 52. As illustrated in FIGS. 11B and 11C, the plurality of pressure chambers 10 is arranged adjacent to each other in the short side direction, and the recessed portion 30 is formed on each of the pressure chamber walls 50.

Figure 12A:
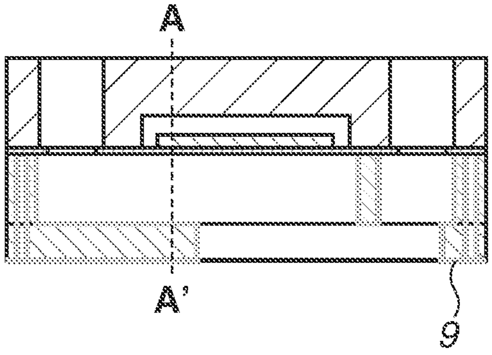
FIG. 12A is a view illustrating processes in another example of the manufacturing method of the liquid ejection head according to the embodiment.
Figure 12B:
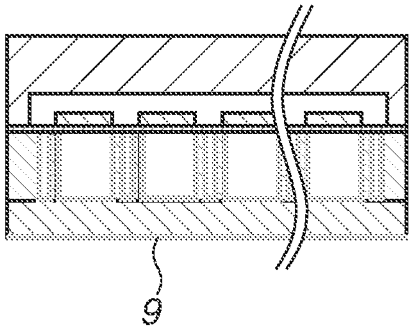
FIG. 12B is a cross-sectional view taken along a line A-A' in FIG. 12A.

Next, as illustrated in FIGS. 12A and 12B, the function film 9 is formed on the surfaces of the pressure chamber wall member 5 and the structure 7. FIG. 12A is a cross-sectional view in the direction parallel to the long side direction of the pressure chambers 10, and FIG. 12B is a cross-sectional view taken along a line A-A' in FIG. 12A. It is possible to obtain an effect of enhancing the strength of the pressure chamber wall member 5 by forming the function film 9 also on a wall surface of the recessed portion 30. Thereafter, there is a case where a working process or a cleaning process is performed using plasma treatment in a process where the nozzle plate 6 is to be bonded to the pressure chamber wall member 5 and processed, or in a process where diced individual chips are to be mounted. At this time, the function film 9 can be used as a film that protects the pressure chamber wall member 5 from being damaged due to the plasma treatment.

Figure 13A:
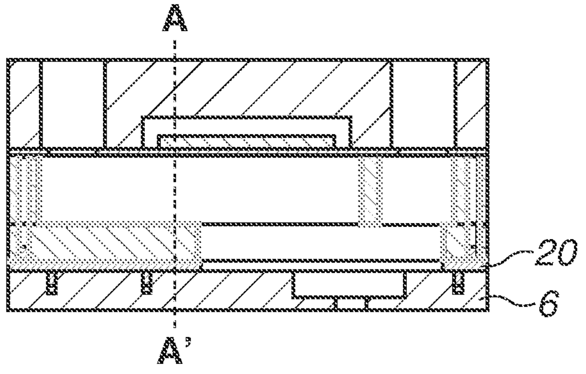
FIG. 13A is a view illustrating processes in another example of the manufacturing method of the liquid ejection head according to the embodiment.
Figure 13B:
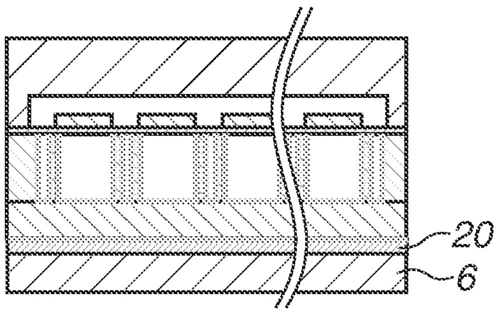
FIG. 13B is a cross-sectional view taken along a line A-A' in FIG. 13A.

Next, as illustrated in FIG. 13A, the nozzle plate 6 is bonded to the pressure chamber wall member 5 by using the adhesive agent 20. FIG. 13A is a cross-sectional view in the direction parallel to the long side direction of the pressure chambers 10, and FIG. 13B is a cross-sectional view taken along a line A-A' in FIG. 13A.

In the present embodiment, ink is supplied from an ink tank arranged outside the liquid ejection head to the liquid ejection head and, inside the liquid ejection head, the ink is further supplied to the pressure chambers 10 and the nozzles 11 through the liquid supply ports 4*a*. The liquid ejection head according to the present embodiment further includes a driving circuit (not illustrated) on the substrate 1, which applies a driving electric signal for driving each piezoelectric element 2. When the electric signal is applied to each piezoelectric element 2 from the driving circuit, the piezoelectric effects of the piezoelectric elements 2 cause the vibration plates 3 to warp toward the inner side of the pressure chambers 10, so that the liquid is ejected from the nozzles 11.

In the liquid ejection head according to the present embodiment, the nozzles 11 can be arranged in a highly-integrated manner. Depending on the application purpose of the liquid ejection head, it may be desirable that liquid droplets be ejected as much as possible at a time. In this case, it is effective to simultaneously drive two or more of the piezoelectric elements 2 in the liquid ejection head according to the present embodiment. In this case, an integrated circuit is generally used, but an influence of a process temperature in forming the piezoelectric elements 2 may cause a manufacturing issue, such as a high degree of difficulty in building the piezoelectric elements 2 and the integrated circuit on the same substrate 1, or an issue of cost increase. Thus, it is desirable that common wiring for inputting the driving electric signal to two or more of the piezoelectric elements 2 be arranged. Common wiring connected to two or more of the piezoelectric elements 2 is desirably arranged. More desirably, the number of piezoelectric elements 2 connected to one common wiring is 10 or more. Even more desirably, the number of piezoelectric elements 2 connected to one common wiring is 100 or more, and yet even more desirably, the number is 1000 or more. In this case, it is also possible to obtain an effect of reducing the number of pads for inputting the electric signal.

The liquid ejection head having the configuration illustrated in FIG. 4E was formed through the processes illustrated in FIGS. 9A to 9F.

The substrate 1 including the piezoelectric elements 2 including piezoelectric zirconate titanate (PZT), the driving circuit (not illustrated), the liquid supply ports 4, and the vibration plates 3 including silicon as a base material was formed.

The pressure chamber wall member 5 was formed using two layers of a photosensitive resin on the side of the first surface 100 of the substrate 1. First, as the first pressure chamber wall member 51, a dry film having a thickness of 40 μm and made of a negative-type photosensitive epoxy resin was transferred onto the first surface 100. Then, the latent images of portions corresponding to the pressure chambers 10 were formed by performing post-exposure bake (PEB) after exposure using a photomask. Subsequently, as the second pressure chamber wall member 52, a dry film having a thickness of 20 μm and made of a negative-type photosensitive epoxy resin was transferred onto the first pressure chamber wall member 51. Then, the latent images of portions corresponding to the pressure chambers 10 and the structure 7 were formed by performing PEB after exposure using a photomask. Then, the first pressure chamber wall member 51 and the second pressure chamber wall member 52 were collectively developed by using an organic solvent. Further, heat treatment for accelerating hardening of the epoxy resin was performed. The width of each pressure chamber wall 50 between the pressure chambers 10 is 10 μm, the width of each pressure chamber 10 in the short side direction is 32.5 μm, the width of each pressure chamber in the long side direction is 1000 μm, and the pressure chambers 10 were formed at a pitch of 42.5 μm. The structure 7 was formed at both the ends in the long side direction by using the second pressure chamber wall member 52. The height of the structure 7 is 20 μm, which is defined by a film thickness of the second pressure chamber wall member 52, and the width of the structure 7 is 40 μm. As the function film 9, a film having a thickness of 0.5 μm and made of $Al_2O_3$ was formed on the pressure chamber wall member 5 using the ALD method, and a film having a thickness of 0.5 μm and made of $Ta_2O_5$ was further formed thereon.

Next, the adhesive agent 20, which is a film-type thermosetting epoxy-based adhesive agent, was transferred onto the pressure chamber wall member 5, and the nozzle plate 6, where a part of the nozzles 11 is processed, was bonded to the pressure chamber wall member 5. Silicon was used for the nozzle plate 6. After a mask pattern using a resist was formed on the nozzle plate 6, the liquid ejection head was formed by making the nozzles 11 penetrate the nozzle plate 6 using dry etching.

As a comparison example, a liquid ejection head without the structure 7 was formed. Except for the structure 7, the liquid ejection head was formed using a method similar to the method used for the liquid ejection head according to the present embodiment. The liquid ejection head according to the present embodiment was compared with the liquid ejection head according to the comparison example, and a result of the comparison indicates that dimensional accuracy of the pressure chamber walls 50 is higher in the liquid ejection head according to the present embodiment than in the liquid ejection head according to the comparison example, and a greater liquid ejection frequency is obtained in the liquid ejection head according to the present embodiment than in the liquid ejection head according to the comparison example.

As a result of an earnest study, the inventors of the present disclosure have found that lowering of the liquid ejection frequency can be suppressed by building a structure for supporting at least two side walls of a pressure chamber when walls of the pressure chamber are formed using a photosensitive resin. According to the present embodiment, it is possible to provide a liquid ejection head capable of suppressing deformation of pressure chambers in a case where the pressure chambers are formed of a resin, and a manufacturing method of the liquid ejection head.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-122441, filed Aug. 1, 2022, which is hereby incorporated by reference herein in its entirety.

What is claimed is:

1. A liquid ejection head comprising:

a nozzle plate where a nozzle for ejecting a liquid is provided;

a substrate including a piezoelectric element for generating pressure for ejecting the liquid from the nozzle; and a wall member made of a resin and provided between the nozzle plate and the substrate to form a pressure chamber that communicates with the nozzle, wherein a structure for connecting at least two side surfaces, among a plurality of side surfaces of the wall member that forms the pressure chamber, is provided, wherein the liquid ejection head includes a plurality of the nozzles and a plurality of the pressure chambers each having a cuboid shape and respectively corresponding to the plurality of nozzles, and wherein the liquid ejection head satisfies a relationship T/L>2, where L is a thickness of the wall member between the plurality of pressure chambers adjacent to each other in a short side direction of the plurality of pressure chambers and T is a height of the plurality of pressure chambers in a direction perpendicular to the substrate.

2. The liquid ejection head according to claim 1, wherein the pressure chamber is a space surrounded by the wall member, the nozzle plate, and the substrate.

3. The liquid ejection head according to claim 1, wherein the structure is formed integrally with the wall member using a same material as the wall member.

4. The liquid ejection head according to claim 1, wherein the cuboid shape is arranged in the short side direction of the plurality of pressure chambers, and wherein, in a planar view in the direction perpendicular to the substrate, the structure continuously connects side surfaces of the wall member between the plurality of pressure chambers in the short side direction of the plurality of pressure chambers.

5. The liquid ejection head according to claim 1, wherein, in a planar view in the direction perpendicular to the substrate, the structure is arranged at both ends of the piezoelectric element in a long side direction thereof, the piezoelectric element having a rectangular shape.

6. The liquid ejection head according to claim 1, wherein the wall member and the structure are covered with a function film made of a material having a Young's modulus of 50 GPa or more.

7. The liquid ejection head according to claim 1, wherein the wall member is formed of two or more layers of a resin.

8. The liquid ejection head according to claim 1, wherein the nozzle plate and the wall member are formed integrally.

9. The liquid ejection head according to claim 1, further comprising a driving circuit configured to apply a driving electric signal for driving each of a plurality of the piezoelectric elements, wherein the driving circuit includes common wiring for inputting the driving electric signal to two or more of the plurality of piezoelectric elements.

10. A liquid ejection head comprising:

a plurality of nozzles configured to eject a liquid;

a plurality of pressure chambers each having a cuboid shape and respectively corresponding to the plurality of nozzles;

a nozzle plate including a nozzle of the plurality of nozzles;

a substrate including a piezoelectric element configured to generate pressure for ejecting the liquid; and a wall member made of a resin including at least two side surfaces, wherein the wall member is provided between the nozzle plate and the substrate to form a pressure chamber that communicates with at least one nozzle of the plurality of nozzles, and wherein the wall member has a thickness (L) between adjacent pressure chambers in a short side direction and a height (T) in a direction perpendicular to the substrate, with $T/L>2$.

* * * * *